United States Patent
Weippert

(10) Patent No.: US 9,964,751 B2
(45) Date of Patent: May 8, 2018

(54) IMMERSION FLUID FOR MICROSCOPY

(71) Applicant: Carl Zeiss Microscopy GmbH, Jena (DE)

(72) Inventor: Hans-Joachim Weippert, Aalen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 807 days.

(21) Appl. No.: 14/289,472

(22) Filed: May 28, 2014

(65) Prior Publication Data

US 2014/0355109 A1    Dec. 4, 2014

(30) Foreign Application Priority Data

May 29, 2013 (DE) .......................... 10 2013 210 113

(51) Int. Cl.
G02B 21/33 (2006.01)
G02B 21/16 (2006.01)

(52) U.S. Cl.
CPC ............. G02B 21/33 (2013.01); G02B 21/16 (2013.01)

(58) Field of Classification Search
None
See application file for complete search history.

(56) References Cited

U.S. PATENT DOCUMENTS

| | | | |
|---|---|---|---|
| 4,789,490 A | 12/1988 | Tanaka | |
| 5,817,256 A | 10/1998 | Weippert | |
| 6,221,281 B1 | 4/2001 | Motoyama | |
| 8,647,878 B2 | 2/2014 | Weippert | |
| 2010/0212547 A1* | 8/2010 | Weippert | .............. C07C 69/616 106/287.2 |

FOREIGN PATENT DOCUMENTS

| | | |
|---|---|---|
| DE | 197 05 978 A1 | 9/1997 |
| DE | 10 2009 010 503 A1 | 9/2010 |
| EP | 0 209 621 B1 | 5/1990 |

\* cited by examiner

*Primary Examiner* — Jill A Warden
*Assistant Examiner* — Julie L Tavares
(74) *Attorney, Agent, or Firm* — Christensen, Fonder, Dardi & Herbert PLLC

(57) ABSTRACT

An immersion liquid for microscopy is provided, comprising (a) an organic compound which contains a saturated polycyclic hydrocarbon residue, (b) an oligomeric or polymeric saturated acyclic hydrocarbon and (c) an alkyl aromatic compound, selected from the group consisting of alkyl naphthalene and alkyl biphenyl.

11 Claims, No Drawings

IMMERSION FLUID FOR MICROSCOPY

PRIORITY CLAIM

The present application claims priority to German Patent Application No. 10 2013 210 113.9, filed on May 29, 2013, which said application is incorporated by reference in its entirety herein.

FIELD OF THE INVENTION

The invention relates to an immersion liquid for microscopy, comprising (a) an organic compound which contains a saturated polycyclic hydrocarbon residue, (b) an oligomeric or polymeric saturated acyclic hydrocarbon and (c) an alkyl aromatic compound, selected from the group consisting of alkyl naphthalene and alkyl biphenyl. Furthermore, the invention relates to the use of the immersion liquid according to the invention in microscopy and a process for preparing the immersion liquid.

BACKGROUND

Immersion liquids are used in microscopy in particular in high-resolution immersion object lenses. The optical properties of the immersion liquid are of decisive importance for a high image quality, in particular a index of refraction that is adapted to the use and a dispersion (Abbe number) that is adapted to the use, as well as a high transmission and low residual fluorescence. Furthermore, a viscosity that is suitable for handling is necessary and the immersion liquid should neither dissolve microscopy dyes nor chemically attack the samples to be examined.

Immersion object lenses, such as are used in microscopy, are calculated to the standard temperature of 23° C. (ISO 8036). Under working conditions not equal to 23° C., image errors (spherical aberrations) occur, which lead to a deterioration of the image quality. The more the temperature deviates from 23° C., the more serious the image errors are.

Temperature deviations can result from particular examination methods which make the use of tempering chambers necessary, or else are also present due to the system, e.g. through the self-heating of electronic components, for example to 27° C. or 30° C. Examination processes in which work is done at temperatures other than 23° C. are e.g. examinations at body temperature (37° C.), up to 45° C. in protein examinations under heat shock, 16-18° C. in examinations of fish, amphibians or invertebrates and 4° C. in marine biology examinations. Until now, no immersion liquids have been known which provide acceptable image qualities in these temperature ranges. In a company-internal study, image errors in immersion object lenses due to temperature influences were systematically investigated and it was shown that the greatest influence arises from the immersion liquids used.

In the case of organic liquids, the temperature coefficient of the index of refraction $n_e$ (546.1 nm) lies in the range of from approx. $-3.5 \times 10^4/°$ C. to $-4.2 \times 10^4/°$ C. This applies correspondingly to immersion liquids. In the case of optical glasses, the temperature coefficient of the index of refraction $\Delta n/\Delta T$ lies in the range 20-40° C. for $n_e$ at $-8.1 \times 10^{-6}/°$ C. (optical glass PK51) and $10.0 \times 10^{-6}/°$ C. (optical glass SF6). If immersion liquids are used at temperatures not equal to 23° C., their viscosity-temperature behaviour must also be taken into account. Similarly to the case of mineral oil products, the viscosity increases significantly in the cold and decreases correspondingly greatly in the warm. The dependency of the viscosity on the temperature behaves exponentially. The viscosity index (according to DIN ISO 2909) is used as characteristic value for the viscosity-temperature behaviour of Newtonian fluids such as lubricating oils.

In high-resolution microscopy, in addition to the already-mentioned temperature influence, parameters such as type of object lens, working distance, cover glass thickness and index of refraction, and the index of refraction of the examined sample also have an influence on the imaging quality. As modern microscopy is evolving towards ever higher resolutions, it is necessary, to achieve high image qualities, that the immersion liquid used can be adapted to the respective preparation temperatures. In high-resolution microscopy, it can furthermore be necessary, deviating from the standard index of refraction according to ISO 8036, to prepare immersions with variable index of refraction which are set exactly to the respective examination conditions.

The reference temperature in the ISO standard for immersion liquids (ISO 8036) is 23±0.1° C., the index of refraction at 546.1 nm $n_e$=1.5180±0.0005. The immersion liquids adapted to the standard temperature of 23° C. and available on the market do not, however, fulfil the above-described requirements.

SUMMARY

The object of the invention is therefore to provide an immersion liquid which is suitable outside of the standard temperature of 23° C. for microscopic uses and provides excellent image qualities.

The object is achieved according to the invention by an immersion liquid for microscopy, comprising
  a) an organic compound which contains a saturated polycyclic hydrocarbon residue,
  b) an oligomeric or polymeric saturated acyclic hydrocarbon and
  c) an alkyl aromatic compound, selected from the group consisting of alkyl naphthalene and alkyl biphenyl.

The object is further achieved by the use of this immersion liquid in microscopy, preferably in fluorescence microscopy.

Surprisingly, it is possible with the immersion liquid according to the invention to set the three parameters index of refraction, dispersion (Abbe number) and viscosity optimally for a desired use, at working temperatures which are different from 23° C. and lie roughly in the range of 0-50° C.

The three components of the immersion liquid according to the invention are sufficiently transparent in the entire visible spectral range and in the neighbouring UV-A range and NIR range (approx. 350-1000 nm) and either the components are obtainable already sufficiently pure themselves or a suitable purification possibility is available, for example by vacuum distillation or activated carbon treatment followed by superfine filtration, with the result that a low residual fluorescence is also achievable. As a whole, microscopic images with excellent image quality can be achieved with the immersion liquid according to the invention.

When setting the parameters index of refraction, Abbe number and viscosity, the organic compound which contains a saturated polycyclic hydrocarbon residue has the task of making available a low dispersion (high Abbe number) with, at the same time, a relatively high index of refraction. The oligomeric or polymeric saturated acyclic hydrocarbon primarily serves to increase the viscosity of the immersion liquid, which is of importance in particular at higher working temperatures. An immersion liquid which is too thin has the disadvantage that it runs off the object plate too quickly and thus cannot hold the optical contact between object lens and preparation for long enough. In the case of an immersion liquid which is too thick, on the other hand, disruptive small bubbles can forth in the liquid when applied to the preparation.

The third component, the alkyl aromatic compound, introduces a very high index of refraction into the mixture, with the result that, among other things, the index of refraction reduced by the proportion of oligomeric and/or polymeric hydrocarbon can be raised to a desired value again. In the combination of the three components, an optimum immersion liquid can thus always be provided over a temperature range of 0-50° C. In addition, samples to be examined are not chemically attacked by the immersion liquid according to the invention, and microscopy dyes are not dissolved.

DETAILED DESCRIPTION

By "oligomeric" and "polymeric" is meant within the meaning of the invention that the thus designated compound (hydrocarbon) is constructed from identical units (monomers) and the oligomeric compound comprises 5-30 monomers and the polymer compound more than 30 monomers.

By a hydrocarbon is meant within the meaning of the invention an organic compound consisting of carbon and hydrogen. By aliphatic is meant, within the meaning of the general IUPAC definition, an organic chemical compound which is not aromatic. By a "saturated hydrocarbon" is meant within the meaning of the invention that the hydrocarbon does not contain any carbon-carbon multiple bonds. The saturated hydrocarbons are thus also aliphatic, as they do not contain any aromatic compounds because of a lack of carbon-carbon multiple bonds.

By an "acyclic hydrocarbon" is meant within the meaning of the invention that the hydrocarbon does not contain any rings. By a "polycyclic hydrocarbon" is meant a hydrocarbon with two or more rings. A residue of a hydrocarbon is derived from the hydrocarbon by removal of a H atom.

An "aromatic compound", within the meaning of the usual definition, is a molecule with at least one ring system which contains conjugated double bonds, free electron pairs or vacant p-orbitals with a number of 4n+2 (n=an integer) delocalized electrons. An alkyl aromatic compound carries one or more alkyl groups. An alkyl group is a residue derived from an alkane by removal of a hydrogen, for example methyl, ethyl, propyl, butyl.

The organic compound which contains a saturated polycyclic hydrocarbon residue provides a low dispersion due to the saturated multiple ring system. The organic compound which contains a saturated polycyclic hydrocarbon residue can be a saturated polycyclic hydrocarbon which carries substituents that are usual in organic chemistry, for example hydroxy, carboxylic acid or keto groups. Preferably, it is an ester or ether of a hydroxy-substituted saturated polycyclic hydrocarbon, i.e. a saturated polycyclic hydrocarbon which has OH groups.

The saturated polycyclic hydrocarbon residue is preferably a tri- or tetracyclic hydrocarbon residue. Furthermore, it is preferred that the saturated polycyclic hydrocarbon residue has 8-16, in particular 10-12 carbon atoms. Particularly preferably, the saturated polycyclic hydrocarbon residue is a tricyclodecane residue (TCD), in particular tricyclo[5.2.1.0$^{2,6}$]decanyl, as tricyclodecane and some derivatives thereof are available on an industrial scale because they can be obtained from the dimers of cyclopentadiene.

The organic compound which contains a saturated polycyclic hydrocarbon residue is preferably an ester or ether of a hydroxy-substituted saturated polycyclic hydrocarbon, for example an ester or ether of tricyclodecane alcohols, in particular hydroxymethyltricyclo[5.2.1.0$^{2,6}$]decane and/or bis(hydroxymethyl)tricyclo[5.2.1.0$^{2,6}$]decane. 8-Hydroxymethyltricyclo[5.2.1.0$^{2,6}$]decane and 9-hydroxymethyltricyclo[5.2.1.0$^{2,6}$]decane as well as 3,8-bis(hydroxymethyl)tricyclo[5.2.1.0$^{2,6}$]decane, 3,9-bis(hydroxymethyl)tricyclo[5.2.1.0$^{2,6}$]decane, 4,8-bis(hydroxymethyl)tricyclo[5.2.1.0$^{2,6}$]decane and 4,9-bis(hydroxymethyl)triyclo[5.2.1.0$^{2,6}$]decane are preferred. The TCD alcohols available on an industrial scale, TCD alcohol M (8(9)-hydroxymethyltricyclo[5.2.1.0$^{2,6}$]decane) and TCD alcohol DM (3(4),8(9)-dihydroxymethyltricyclo[5.2.1.0$^{2,6}$]decane), from Oxea GmbH, Oberhausen, Germany, are particularly preferred. Tricyclodecanol esters are further preferred and, of these, esters with dicarboxylic acids are particularly preferred. Examples of suitable dicarboxylic acids are phthalic acid, isophthalic acid, terephthalic acid, hexahydrophthalic acid, hexahydroisophthalic acid, hexahydroterephthalic acid, malonic acid, succinic acid, maleic acid, glutaric acid, adipic acid or sebacic acid. The usual esterification processes known to a person skilled in the art can be used for the esterification. Adipic acid esters, in particular di(hydroxymethyltricyclo[5.2.1.0$^{2,6}$]decane) adipate, are particularly preferred.

Oligomers and polymers of olefins, in particular oligomers and polymers of mono-olefins as well as hydrogenated oligomers and polymers of dienes, are preferred as oligomeric or polymeric saturated acyclic hydrocarbons. Oligomeric ethylene and polymeric ethylene (polyethylene), oligomeric propylene and polymeric propylene (polypropylene), oligomeric butylene and polymeric butylene (polybutylene), oligomeric isobutylene and polymeric isobutylene (polyisobutylene), hydrogenated oligomeric butadiene and hydrogenated polymeric butadiene (polybutadiene) as well as hydrogenated oligomeric isoprene and hydrogenated polymeric isoprene (polyisoprene) are particularly preferred. The above-named oligomeric compounds are sometimes also called polymers in the literature and in practice, although the molar masses (molecular weights) lie below those of typical polymers. In this sense, allusion can be made to polyethylene, polypropylene, polybutylene, polyisobutylene, hydrogenated polybutadiene and hydrogenated polyisoprene as preferred compounds. Oligomeric isobutylene, for example Oppanol® B from BASF, Ludwigshafen, in particular Oppanol® B3, and polymeric isobutylene (polyisobutylene) as well as oligomeric isoprene and polymeric isoprene (polyisoprene) are particularly preferred.

The average molecular weight Mn (number-average) of the oligomeric or polymeric saturated acyclic hydrocarbon in the immersion liquid according to the invention preferably lies in the range of 400-4000 g/mol, in particular 600-2000 g/mol, particularly preferably 800-1000 g/mol. The oligomeric or polymeric saturated acyclic hydrocarbon preferably comprises 6-80 monomers, in particular 10-40 monomers.

The oligomeric or polymeric saturated acyclic hydrocarbon is to give the immersion liquid according to the invention a certain viscosity, among other things. The kinematic viscosity of the immersion liquid according to the invention then advantageously, at the desired working temperature (0-50° C.), lies at 150-1500 mm²/s, in particular at 250-1000 mm²/s. The kinematic viscosity of the oligomeric or polymeric saturated acyclic hydrocarbon used is, at 20° C., preferably 5,000-50,000 mm²/s, particularly preferably 15,000-40,000 mm²/s, in particular 22,000-35,000 mm²/s.

The alkyl aromatic compound is an alkyl naphthalene or an alkyl biphenyl, wherein the naphthalene or the biphenyl can carry one or more alkyl groups, it is preferably a mono-, di- or trialkyl aromatic compound. Methyl, ethyl, n-propyl, i-propyl (isopropyl), n-butyl and i-butyl (isobutyl) are preferred as alkyl groups. The aromatic compound is naphthalene or biphenyl, wherein naphthalene is preferred. Isopropyl naphthalene, diisopropyl naphthalene, triisopropyl naphthalene, isopropyl biphenyl, diisopropyl biphenyl and triisopropyl biphenyl are particularly preferred, wherein diisopropyl naphthalene and isopropyl biphenyl are particularly preferred. In the case of the alkyl aromatic compounds with several alkyl groups, in each case isomer mixtures or isomer-pure compounds can be used. In the case of the diisopropyl compounds, for example technically available mixtures of isomeric diisopropyl naphthalenes or isomeric diisopropyl biphenyls can thus be used, e.g. mixtures of 1,5- and 2,6-diisopropyl naphthalene from Rutgers Kureha Solvents, Duisburg, Germany, or isomer-pure compounds can be used, for example 1,5-diisopropyl naphthalene, 2,6-diisopropyl naphthalene or 4,4'-diisopropyl biphenyl. 1,5-Diisopropyl naphthalene, 2,6-diisopropyl naphthalene and 4-isopropyl biphenyl are particularly preferred.

The immersion liquid according to the invention contains, relative to the total mass, preferably 30-75 wt.-% of the organic compound which contains a saturated polycyclic hydrocarbon residue. Furthermore, it is preferred that the oligomeric or polymeric saturated aliphatic hydrocarbon, relative to the total mass of the immersion liquid, makes up 15-45 wt.-%. The alkyl aromatic compound, selected from the group consisting of alkyl naphthalene and alkyl biphenyl, is preferably contained in 10-25 wt.-% of the total mass of the immersion liquid.

The index of refraction, the dispersion and the viscosity of the immersion liquid according to the invention can be set to desired values for a particular working temperature. In particular, a index of refraction $n_e$ at the desired working temperature can be set in the range of 1.5100-1.5500, preferably 1.5180-1.5300. The Abbe number, at the desired working temperature, can be set in the range of 39-47 and the kinematic viscosity between 150-1500 mm²/s. The working temperature is 0-50° C., preferably 0-50° C. excluding 23° C., in particular 0-22° C. and 24-50° C.

The immersion liquid according to the invention comprises an organic compound containing a saturated polycyclic hydrocarbon residue, an oligomeric or polymeric saturated acyclic hydrocarbon and an alkyl naphthalene and/or an alkyl biphenyl. In an advantageous embodiment, the immersion liquid according to the invention comprises an ester or ether of a hydroxy-substituted saturated polycyclic hydrocarbon, oligomeric isobutylene and an alkyl naphthalene and/or an alkyl biphenyl.

In a preferred embodiment of the invention, the immersion liquid additionally comprises a paraffin oil. This can be advantageous in particular at lower temperatures in order not to obtain any immersion liquid that is too viscous. Preferably, the paraffin oil has a kinematic viscosity at 20° C. of roughly 30-270 mm²/s, thick paraffin oil has a kinematic viscosity of roughly 120-270 mm²/s. By a paraffin oil is meant within the meaning of the invention a mixture of alkanes, preferably with 18 to 32 carbon atoms.

The invention furthermore relates to the use of the immersion liquid in microscopy, in particular in fluorescence microscopy. In addition, the invention relates to a process for preparing the immersion liquid according to the invention, comprising mixing the described components.

It is understood that the features mentioned above and those yet to be explained below can be used, not only in the stated combinations, but also in other combinations or alone, without departing from the scope of the present invention.

The following examples illustrate the invention.

Measurement Methods:

Index of Refraction and Abbe Numbers:

The indices of refraction were measured with an Abbe refractometer, Zeiss, including thermostat, mercury-cadmium spectral lamp, interference filter for 480.0 nm ($n_{F'}$), 546.1 nm ($n_e$) and 643.8 nm ($n_{e'}$).

$$\text{Calculation of the Abbe number: } v_e = \frac{(n_e - 1)}{(n_{F'} - n_{C'})}$$

Viscosities:

The kinematic viscosities were determined with an Ubbelohde viscometer according to DIN 51562 using an automatic capillary viscometer of the PVS 1 type from Lauda. The kinematic and dynamic viscosity can, as is known, be converted into each other via the density.

Molecular Weights:

Where necessary, molecular weights were determined by solution viscosity measurements with an Ubbelohde capillary viscometer of the PVS 1 type from Lauda, in accordance with DIN 53726-53728.

Example 1: Reference Temperature 4° C.

index of refraction at 4° C. $n_e$=1.5180
39.6 wt.-% di-TCD methylol adipate
28.4 wt.-% paraffin oil, thick
12.9 wt.-% polyisobutylene, Mn approx. 900 g/mol
19.1 wt.-% diisopropyl naphthalene
residual fluorescence F (365 nm/450 nm)=0.034 mg/l quinine sulphate equivalent
transmission at 365 nm (d=10 mm)=95.7%
kinematic viscosity at 4° C.: 1506 mm²/s
Abbe number at 4° C.: $v_e$=42.5

Example 2: Reference Temperature 17° C.

index of refraction at 17° C. $n_e$=1.5180
43.9 wt.-% di-TCD methylol adipate
16.5 wt.-% paraffin oil, thick
19.5 wt.-% polyisobutylene, Mn approx. 900 g/mol
20.1 wt.-% diisopropyl naphthalene
residual fluorescence F (365 nm/450 nm)=0.035 mg/l quinine sulphate equivalent
transmission at 365 nm (d=10 mm)=95.7%
kinematic viscosity at 17° C.: 747 mm²/s
Abbe number at 17° C.: $v_e$=42.5

Example 3: Reference Temperature 30° C.

index of refraction at 30° C. $n_e$=1.5180
55.8 wt.-% di-TCD methylol adipate 27.0 wt.-% polyisobutylene, Mn approx. 900 g/mol
17.2 wt.-% diisopropyl naphthalene
residual fluorescence F (365 nm/450 nm)=0.022 mg/l quinine sulphate equivalent
transmission at 365 nm (d=10 mm)=96.6%
kinematic viscosity at 30° C.: 662 mm$^2$/s
Abbe number at 30° C.: $v_e$=44.7

Example 4: Reference Temperature 37° C.

index of refraction at 37° C. $n_e$=1.5180
60.0 wt.-% di-TCD methylol adipate
20.7 wt.-% polyisobutylene, Mn approx. 900 g/mol
19.3 wt.-% diisopropyl naphthalene
residual fluorescence F (365 nm/450 nm)=0.020 mg/l quinine sulphate equivalent
transmission at 365 nm (d=10 mm)=96.4%
kinematic viscosity at 37° C.: 294 mm$^2$/s
Abbe number at 37° C.: $v_e$=42.8

Example 5: Reference Temperature 45° C.

index of refraction at 45° C. $n_e$=1.5180
56.8 wt.-% di-TCD methylol hexahydroisophthalate
25.1 wt.-% polyisobutylene, Mn approx. 900 g/mol
18.1 wt.-% diisopropyl naphthalene
residual fluorescence F (365 nm/450 nm)=0.090 mg/l quinine sulphate equivalent
transmission at 365 nm (d=10 mm)=88.3%
kinematic viscosity at 45° C.: 525 mm$^2$/s
Abbe number at 45° C.: $v_e$=44.3

Example 6: Reference Temperature 27° C.

index of refraction at 27° C. $n_e$=1.5180
53.4 wt.-% di-TCD methylol adipate
19.1 wt.-% polyisobutylene, Mn approx. 900 g/mol
8.1 wt.-% paraffin oil, thick
19.4 wt.-% diisopropyl naphthalene
residual fluorescence F (365 nm/450 nm)=0.028 mg/l quinine sulphate equivalent
transmission at 365 nm (d=10 mm)=94.8%
kinematic viscosity at 27° C.: 464 mm$^2$/s
Abbe number at 27° C.: $v_e$=43.5

Example 7: Reference Temperature 27° C.

index of refraction at 27° C. $n_e$=1.5180
55.0 wt.-% di-TCD methylol adipate
19.5 wt.-% polyisobutylene, Mn approx. 900 g/mol
8.3 wt.-% paraffin oil, thick
17.2 wt.-% isopropyl biphenyl
residual fluorescence F (365 nm/450 nm)=0.037 mg/l quinine sulphate equivalent
transmission at 365 nm (d=10 mm)=95.7%
kinematic viscosity at 27° C.: 372 mm$^2$/s
Abbe number at 27° C.: $v_e$=43.5

The invention claimed is:

1. An immersion liquid for microscopy consisting essentially of
   (a) 30-75 wt.-% of an organic compound which contains a saturated polycyclic hydrocarbon residue,
   (b) 15-45 wt.-% of an oligomeric or polymeric saturated acyclic hydrocarbon,
   (c) 10-25 wt.-% of an alkyl aromatic compound, selected from the group consisting of alkyl naphthalene and alkyl biphenyl, and
   (d) 0-45 wt.-% of a paraffin oil,
   with the immersion liquid having an Abbe number from 39.0 to 47.0 at 37° C.

2. The immersion liquid according to claim 1, wherein the organic compound which contains a saturated polycyclic hydrocarbon residue is an ester or ether of a hydroxy-substituted saturated polycyclic hydrocarbon with 8-16 carbon atoms.

3. The immersion liquid according to claim 1, wherein the organic compound which contains a saturated polycyclic hydrocarbon residue is an ester or ether of hydroxymethyltricyclo[5.2.1.0$^{2,6}$]decane and/or bis(hydroxymethyl)tricyclo[5.2.1.0$^{2,6}$]decane.

4. The immersion liquid according to claim 1, wherein the organic compound which contains a saturated polycyclic hydrocarbon residue is di(hydroxymethyltricyclo[5.2.1.0$^{2,6}$]decane) adipate.

5. The immersion liquid according to claim 1, wherein the oligomeric or polymeric saturated acyclic hydrocarbon is oligomeric isobutylene or polyisobutylene.

6. The immersion liquid according to claim 1, wherein the oligomeric or polymeric saturated acyclic hydrocarbon has a kinematic viscosity at 20° C. of 15,000-40,000 mm$^2$/s.

7. The immersion liquid according to claim 1, wherein the alkyl aromatic compound is diisopropyl naphthalene or isopropyl biphenyl.

8. A method of microscopy, comprising using the immersion liquid according to claim 1.

9. The method of microscopy according to claim 8, wherein the microscopy is a fluorescence microscopy.

10. The method of microscopy, according to claim 8, wherein the immersion liquid is used at a temperature of 0-22° C. or 24-50° C.

11. A method for preparing an immersion liquid, comprising the steps of mixing together an organic compound which consists essentially of 30-75 wt.-% of a saturated polycyclic hydrocarbon residue, 15-45 wt.-% of an oligomeric or polymeric saturated acyclic hydrocarbon, 10-25 wt.-% of an alkyl aromatic compound selected from the group consisting of alkyl naphthalene and alkyl biphenyl, and 0-45 wt.-% of a paraffin oil, with the immersion liquid having an Abbe number from 39.0 to 47.0 at 37° C.

* * * * *

UNITED STATES PATENT AND TRADEMARK OFFICE
CERTIFICATE OF CORRECTION

PATENT NO. : 9,964,751 B2  
APPLICATION NO. : 14/289472  
DATED : May 8, 2018  
INVENTOR(S) : Weippert Page 1 of 1

It is certified that error appears in the above-identified patent and that said Letters Patent is hereby corrected as shown below:

In the Specification

In Column 3, Line 5, delete "forth" and insert -- form --, therefor.

In Column 6, Line 20, delete "($n_{e'}$)." and insert -- ($n_{c'}$). --, therefor.

Signed and Sealed this  
Fourteenth Day of August, 2018

Andrei Iancu  
*Director of the United States Patent and Trademark Office*